(12) United States Patent
Tidmore et al.

(10) Patent No.: US 11,486,536 B2
(45) Date of Patent: Nov. 1, 2022

(54) EQUIPMENT SUPPORT ASSEMBLY

(71) Applicant: Steve Tidmore, Douglas, GA (US)

(72) Inventors: Steve Tidmore, Douglasville, GA (US); Joshua Tidmore, Geraldine, AL (US)

(*) Notice: Subject to any disclaimer, the term of this patent is extended or adjusted under 35 U.S.C. 154(b) by 0 days.

(21) Appl. No.: 17/027,981

(22) Filed: Sep. 22, 2020

(65) Prior Publication Data

US 2021/0025545 A1 Jan. 28, 2021

Related U.S. Application Data

(60) Provisional application No. 62/961,315, filed on Jan. 15, 2020, provisional application No. 62/878,849, filed on Jul. 26, 2019.

(51) Int. Cl.
| | |
|---|---|
| *F16M 13/02* | (2006.01) |
| *F16M 11/04* | (2006.01) |
| *A47F 7/04* | (2006.01) |
| *H04N 5/655* | (2006.01) |

(52) U.S. Cl.
CPC ............ *F16M 13/02* (2013.01); *A47F 7/04* (2013.01); *F16M 11/041* (2013.01); *H04N 5/655* (2013.01)

(58) Field of Classification Search
CPC ......... F16M 13/02; F16M 11/041; A47F 7/04; H04N 5/655
See application file for complete search history.

(56) References Cited

U.S. PATENT DOCUMENTS

| | | | |
|---|---|---|---|
| 1,817,711 A * | 8/1931 | Rosen | B60R 1/06 248/477 |
| 3,869,798 A * | 3/1975 | Wilkerson | G01M 17/013 33/264 |
| 4,655,236 A | 4/1987 | Dorame et al. | |
| 4,794,399 A | 12/1988 | Sensibaugh | |
| 5,241,977 A | 9/1993 | Flores et al. | |
| 5,295,500 A * | 3/1994 | Leu | E04H 12/2238 135/114 |
| 5,850,843 A | 12/1998 | Mahood et al. | |
| 5,911,399 A * | 6/1999 | Mannion | F16M 13/00 248/514 |
| 5,929,818 A | 7/1999 | Snyder | |
| 6,089,246 A * | 7/2000 | Barnes | A45B 11/00 135/117 |
| 6,698,634 B2 | 3/2004 | Thomson | |
| 7,093,888 B2 | 8/2006 | Anderson et al. | |
| D531,428 S | 11/2006 | Choo | |

(Continued)

FOREIGN PATENT DOCUMENTS

CN 104509093 A 4/2015

*Primary Examiner* — Anita M King
(74) *Attorney, Agent, or Firm* — Gardner, Groff & Greenwald, PC; Blake T. Hudson (57) ABSTRACT

A stand for supporting one or more devices or equipment. The stand includes an engagement assembly, a support assembly and a stability assembly. The engagement assembly is configured to removably engage at least a portion of a fixed structure or a stable component, for example, a wheel assembly or the wheel and/or tire thereof. With the engagement assembly removably engaged with the desired fixed structure or stable component, the support assembly is structurally supported and stabilized so as to generally remain in an upright or vertical orientation while supporting one or more desired devices.

20 Claims, 6 Drawing Sheets

(56) References Cited

U.S. PATENT DOCUMENTS

| | | | |
|---|---|---|---|
| 7,530,538 B2 | 5/2009 | Whalen et al. | |
| D594,675 S | 6/2009 | Cahaly | |
| 7,557,764 B2 | 7/2009 | Krajicek | |
| 8,225,061 B2 | 7/2012 | Greenebaum | |
| 8,434,732 B1 * | 5/2013 | Penn | G09F 15/0043 |
| | | | 248/558 |
| 8,776,811 B2 | 7/2014 | Griffith | |
| 8,814,224 B2 * | 8/2014 | Lange | F16M 11/06 |
| | | | 285/342 |
| 9,631,769 B2 | 4/2017 | McGowan et al. | |
| 9,960,481 B2 | 5/2018 | Roberts et al. | |
| 9,967,512 B2 | 5/2018 | Huffman et al. | |
| 10,005,382 B1 | 6/2018 | Rossi et al. | |
| 10,315,586 B2 | 6/2019 | Livingston | |
| 10,394,112 B2 | 8/2019 | Johnson et al. | |
| 10,619,788 B2 | 4/2020 | Pei | |
| 2003/0052240 A1 | 3/2003 | Springett | |
| 2005/0083403 A1 | 4/2005 | Flores et al. | |
| 2006/0254635 A1 | 11/2006 | Matheus et al. | |
| 2013/0105646 A1 * | 5/2013 | Owens | F16M 11/08 |
| | | | 248/205.1 |
| 2015/0048224 A1 | 2/2015 | Patterson | |
| 2019/0166427 A1 | 5/2019 | Mathiasen et al. | |

\* cited by examiner

EQUIPMENT SUPPORT ASSEMBLY

CROSS-REFERENCE TO RELATED APPLICATION

This application claims the benefit of U.S. Provisional Patent Application Ser. No. 62/878,849 filed Jul. 26, 2019 and U.S. Provisional Patent Application Ser. No. 62/961,315 filed Jan. 15, 2020, the entireties of which are incorporated by reference herein for all purposes.

TECHNICAL FIELD

The present invention relates generally to the field of mounting systems and supportive devices and stands, and more particularly to devices and mounting systems for supporting desired devices and/or equipment.

BACKGROUND

Tailgating, camping and other activities commonly take place in a location that is different from a person's home or primary residence. Often, while away from their primary residence, tools and devices such as cooking equipment, tents, chairs, tables, televisions, satellite equipment and other items are used. In most cases, tools and equipment are generally permanently located and remain in a particular location at the person's primary residence (e.g., grill remains on back patio, television remains mounted to wall or sitting atop entertainment center).

Commonly, while at the desired site away from the primary residence, the person must provide temporary solutions to accommodate the desired tools and devices they wish to use. Furthermore, the person must account for the portability of the tools and devices and account for the time and hassle required to transport, install and uninstall while at the desired site. For example, typically a person is less likely to transport a medium/large television (or other large/cumbersome device(s) or equipment such as large BBQ grills) as they are not travel-friendly and require additional components/equipment to operate or function at the desired site. For example, in most cases, a person will have to additionally bring a portable and sturdy table to act as a platform for transported television to sit atop, or will otherwise have to rest the television atop a ground surface, which is undesirable for viewing. Other large and cumbersome equipment, for example, transporting a BBQ grill, may require an additional luggage carrier or other transportation equipment in order to safely transport the same.

Accordingly, it can be seen that needs exist for improvements to media supports, stands and mounting systems. It is to the provision of a wheel-supported media system and stand meeting these and other needs that the present invention is primarily directed.

SUMMARY

In example embodiments, the present invention provides a wheel-supported media system and stand for supporting a device such as a television. The stand includes an upright support member, a bracket assembly, an extension connected between the upright support member and the bracket assembly. The bracket assembly is configured to removably engage at least a portion of a wheel and/or tire. With the bracket assembly removably engaged with the wheel and/or tire, the upright support member is structurally supported and stable to remain in an upright or vertical orientation while supporting a television.

In one aspect, the present invention relates to a stand including an upright support member, a bracket assembly, and an extension connected between the upright support member and the bracket assembly. In example embodiments, the bracket assembly includes a central opening that is configured to receive at least a portion of a wheel and/or tire. In example embodiments, one or more straps can be provided for removably securing the bracket assembly to the wheel and/or tire. In example embodiments, the device is a television.

In another aspect, the present invention relates to an equipment support assembly including an engagement assembly, a support assembly and a stability assembly. The engagement assembly includes at least one component configured for removable engagement with at least a portion of a wheel assembly. The support assembly is removably engaged with the engagement assembly and configured for removably receiving at least one device or equipment component. The stability assembly is removably engaged with the engagement assembly and configured for providing stability to the support assembly while the engagement assembly is removably engaged with at least a portion of a wheel assembly.

In example embodiments, the engagement assembly includes at least one component removably engageable with at least a portion of a wheel or tire assembled therewith. In example embodiments, the engagement assembly includes two or more components that are assembled together and dimensionally adjustable to provide compatible removable engagement with a wheel or tire assembled therewith. In example embodiments, the engagement assembly includes four L-shaped members, the L-shaped members removably engageable so as to define a dimensionally adjustable, closed-loop bracket, an opening being defined within the closed-loop bracket and configured to receive at least a portion of a wheel assembly. In example embodiments, the support assembly includes at least one support component, a first portion of the at least one support component being removably engageable with a portion of the engagement assembly, and a second portion of the at least one support portion configured for receiving at least one device or equipment component. In example embodiments, the stability assembly includes at least one stability component comprising a first end removably connected with a portion of the engagement assembly and a second end engaging a support surface. In example embodiments, the at least on device or equipment component includes at least one component selected from the group consisting of a television or various electronic devices and equipment, cooking or grilling equipment and an umbrella or shade-providing devices.

In yet another aspect, the present invention relates to a collapsible and portable stand for supporting a device including an upright support, a bracket assembly and a stability extension. The upright support is configured to removably receive the device. The bracket assembly is removably engaged with the upright support and is configured for removable engagement with a fixed structure or stable component. The stability extension includes a first end removably engaged with a portion of the upright support or bracket assembly and a second end extending therefrom and configured for contacting a support or ground surface.

In some example embodiments, the device comprises a television. In some example embodiments, the device comprises a cooking device or equipment. In example embodiments, the bracket assembly includes at least two bracket components that are removably engageable therewith and dimensionally adjustable between a minimum dimension and a maximum dimension. In example embodiments, the bracket assembly includes a junction component that is configured for permitting removable engagement of the upright support thereto, the junction configured to permit adjustment of the position of the upright support relative to the bracket assembly. In example embodiments, the fixed structure or stable component includes a wheel assembly of a vehicle, for example, wherein the wheel assembly includes at least a tire.

In another aspect, the present invention relates to a stand for supporting a television including an upright support assembly, an adjustable bracket, a stability extension component coupled with the adjustable bracket for supporting and providing stability to the upright support member. In example embodiments, the stand further includes a mounting bracket coupled with a portion of the upright support assembly. In example embodiments, the television comprises a mounting portion configured for removable and secure engagement with the mounting bracket. In example embodiments, the adjustable bracket comprises at least one member configured for removable engagement with a fixed structure or stable component. In example embodiments, the fixed structure or stable component comprises a wheel assembly connected to an axle, the wheel assembly at least comprising a tire. In example embodiments, the stand further includes a platform adjustably mounted to at least a portion of the upright support assembly. In example embodiments, the platform includes a surface configured to support an electronic device or media component.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
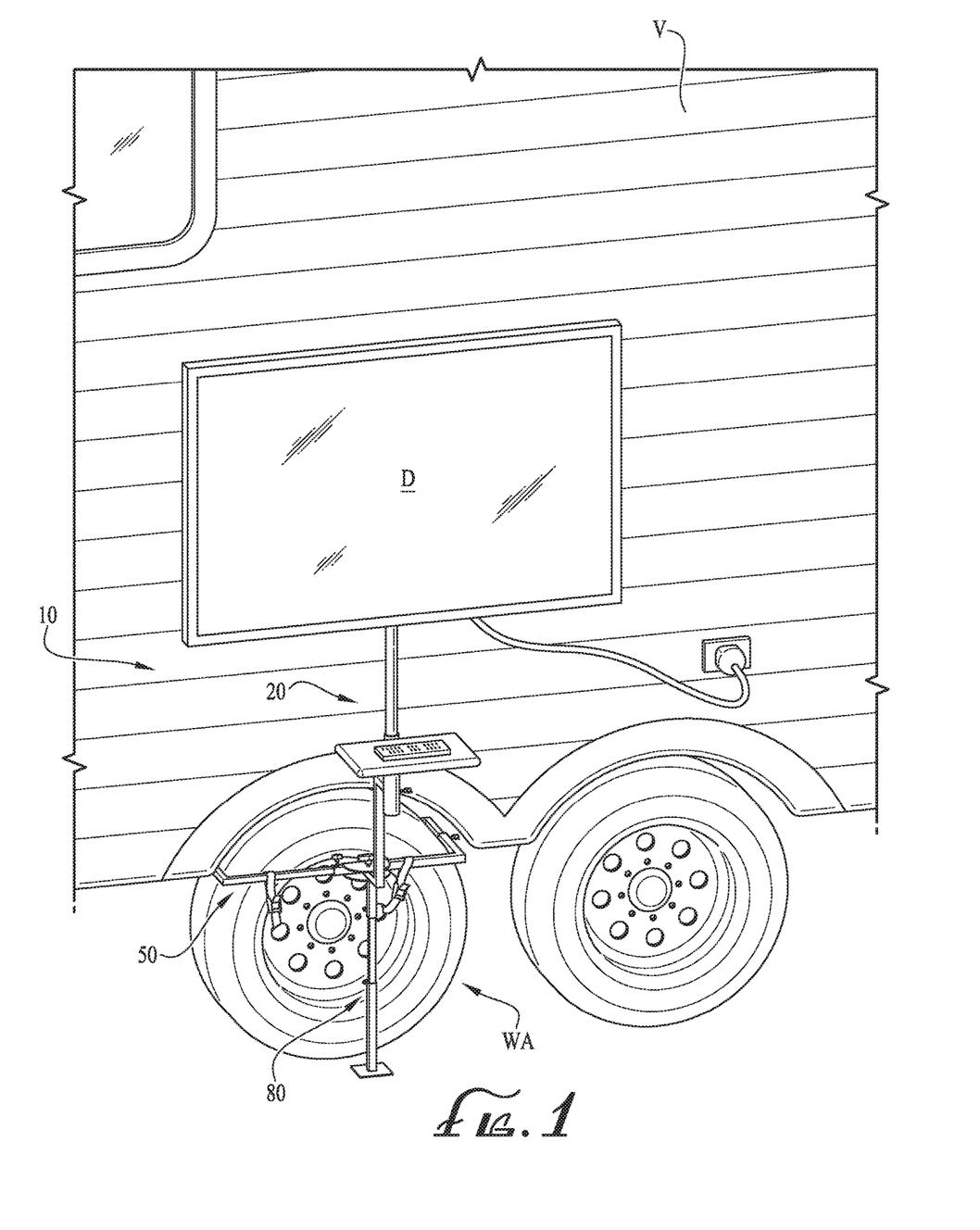
FIG. 1 is a perspective view of an equipment support assembly according to an example embodiment of the present invention.

With reference now to the drawing figures, wherein like reference numbers represent corresponding parts throughout the several views, FIG. 1 shows an equipment support assembly or stand 10 according to an example embodiment of the present invention. In example embodiments, the stand 10 is configured to support various equipment, devices and/or components D as desired, for example, a television, a monitor or other electronic devices or components, recreational equipment, cooking devices or components (e.g., grill), and/or other utility devices (e.g., umbrella or other shade-providing devices). According to some example embodiments, the stand 10 can be configured to support a flag, flag pole, banner and/or other graphics.

Figure 2:
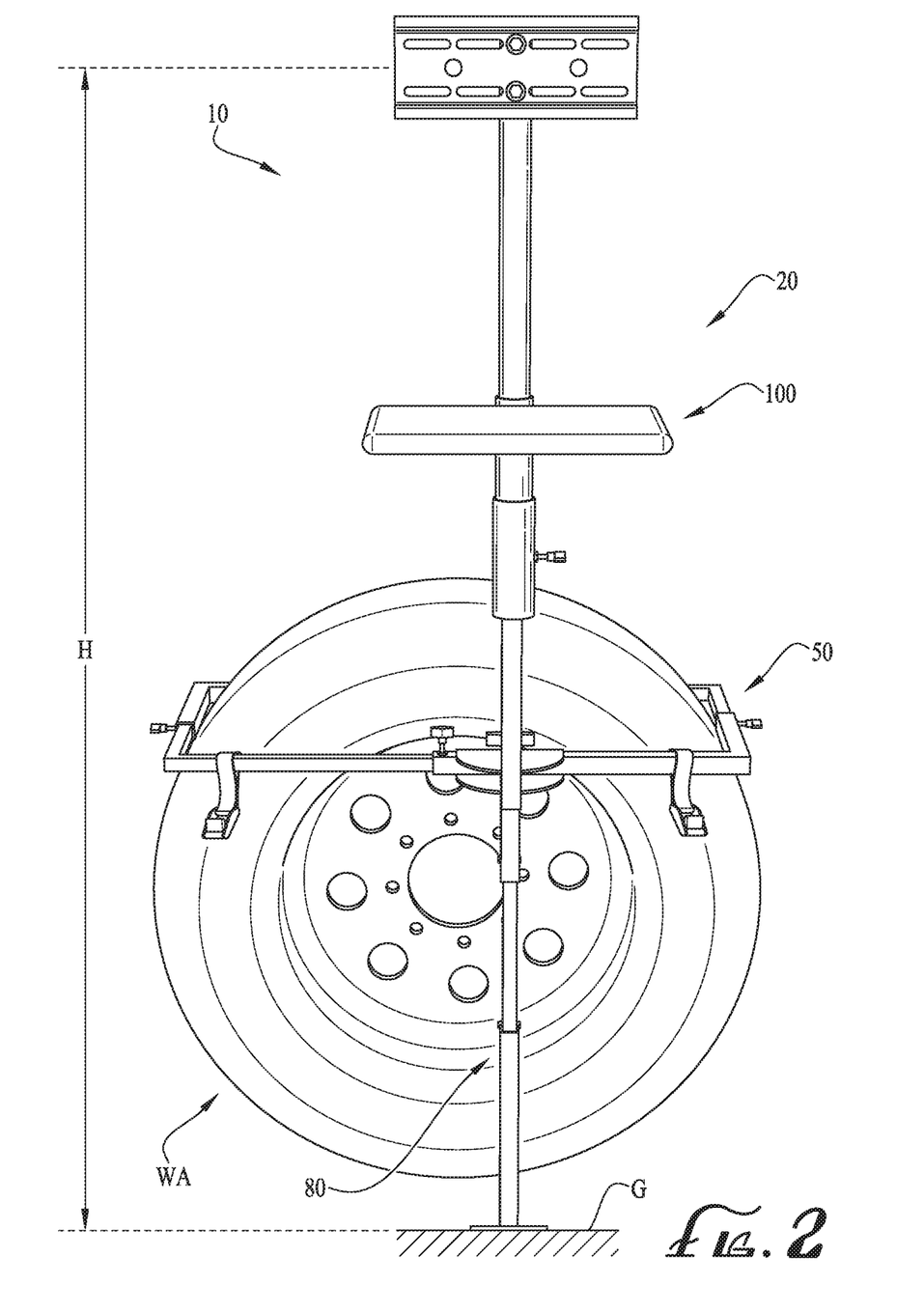
FIG. 2 is a front perspective view of the equipment support assembly of FIG. 1.

According to example embodiments, the stand 10 is configured to support the device D at a desired distance or height H above a ground surface G (see FIG. 2). For example, according to one example embodiment, the device D is a television, which is removably mounted to an upper portion or end of the stand 10 while a lower portion or end of the stand 10 is resting atop and supported by the ground surface G. According to example embodiments, the stand 10 can support a television of any desired size, for example, from about a 20" television up to about an 85" television or greater. According to example embodiments, a portion of the stand 10 is configured to extend therefrom and engage with at least a portion of a wheel assembly WA, for example, at least a portion of a wheel W or tire T thereof, to provide stability and maintain the stand 10 in an upright orientation. Thus, according to example embodiments, the stand 10 can be used to position (or suspend) the device D a distance H above the ground surface G while only relying on a single bracket assembly to engage with at least a portion of the wheel assembly WA for support and stability.

In example embodiments, the stand 10 generally comprises an upright support or support assembly 20, a bracket or engagement assembly 50 and a stability extension or component 80.

In example embodiments, the support assembly 20 comprises one or more components. According to one example embodiment, the support assembly 20 comprises a first component 22 and a second component 30. In example embodiments, the first component 22 is generally in the form of an elongate member 25 comprising a first end 23 and a second end 24 (see FIG. 7). According to one example embodiment, the first component 22 comprises a generally elongate pipe component, for example, which is generally cylindrical and comprises an opening extending entirely therethrough. In example embodiments, the elongate pipe component comprises a 2" cylindrical tube comprising a sufficient thickness to support an axial load up to about 500 lbs or more. In other example embodiments, the elongate pipe component can be in various other forms, comprise various other cross-sectional shapes, or for example, comprise two or more assembled components as desired. In example embodiments, a mount or bracket 26 is provided at the first end 23 for removably receiving at least one device D, for example, a television according to one example embodiment of the present invention.

Figures 6, 7, 8:
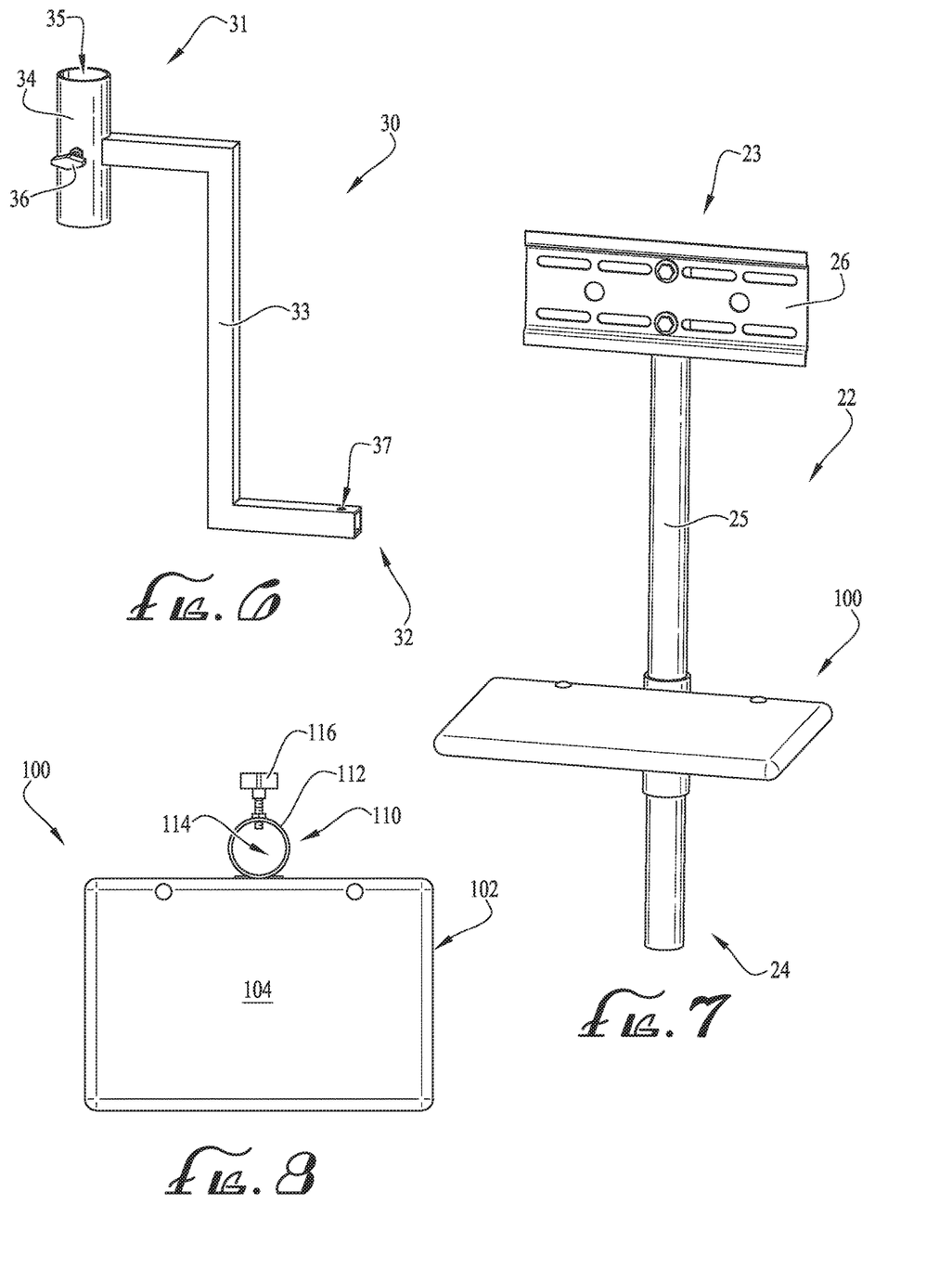
FIG. 6 is a side perspective view of a support portion of the equipment support assembly of FIG. 1.
FIG. 7 is a front perspective view of an upright portion and platform of the equipment support assembly of FIG. 1.
FIG. 8 is a plan view of the platform of the equipment support assembly of FIG. 1.

The second component 30 comprises a support member 33 comprising a first end 31 and a second end 32 (see FIG. 6). In example embodiments, the support member 33 comprises a generally elongate central or intermediate section, and generally transversely-oriented outer sections that define the first and second ends 31, 32. According to example embodiments, the outer section of the first end 31 is generally extending in a direction that is substantially opposite to the direction of the extension of the outer section of the second end 32.

According to example embodiments, a female coupling 34 is generally mounted to a portion of the first end 31, for example, which is configured to receive at least a portion of the elongate member 25 (see FIG. 6). In example embodiments, the female coupling 34 comprises a female receiver or opening 35 that is configured to removably couple with the second end 24 of the first component 22. According to example embodiments, a fastener or coupling component is provided so as to substantially affix (temporarily) the second end 24 of the elongate member 25 within at least a portion of the female coupling 34. According to one example embodiment, the second end 24 of the elongate member 25 extends through the entirety of the opening or channel of the female coupling 34.

Figure 3:
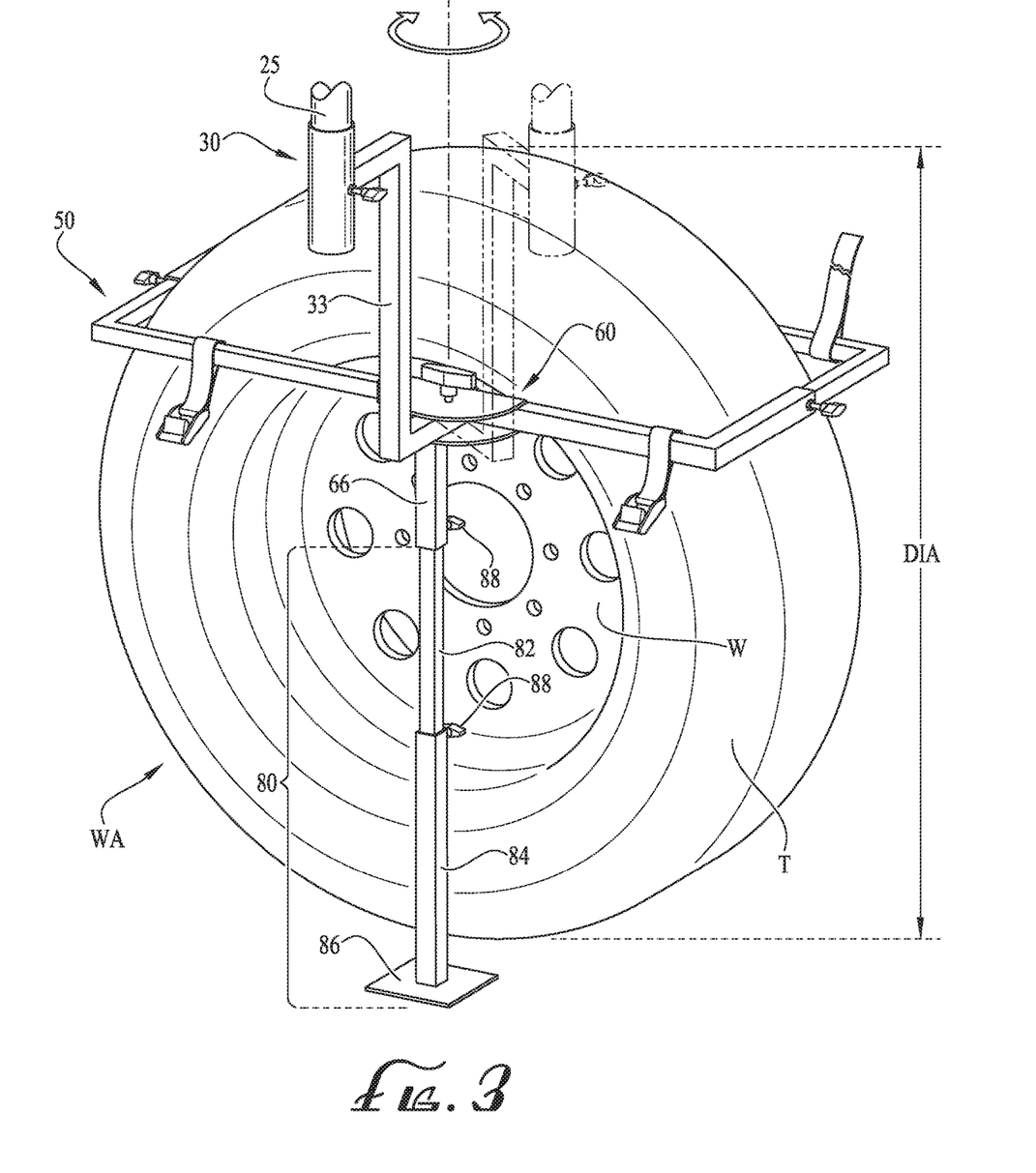
FIG. 3 is a close-up perspective view of the equipment support assembly of FIG. 1.

Referring to FIGS. 1-3, the engagement assembly 50 is configured for removable engagement with a fixed structure or stable component, for example, so as to facilitate the support assembly 20 in maintaining a substantially upright and stable position/orientation. For example, as depicted in FIG. 3, the engagement assembly 50 comprises a hub or junction 60, which is configured to pivotally receive the second end 32 of the second component 30. In example embodiments, a receiver 37 is generally formed near the second end 32, which acts as a pivot axis and receives a fastener 68 when pivotally mounted thereto.

Figure 4:
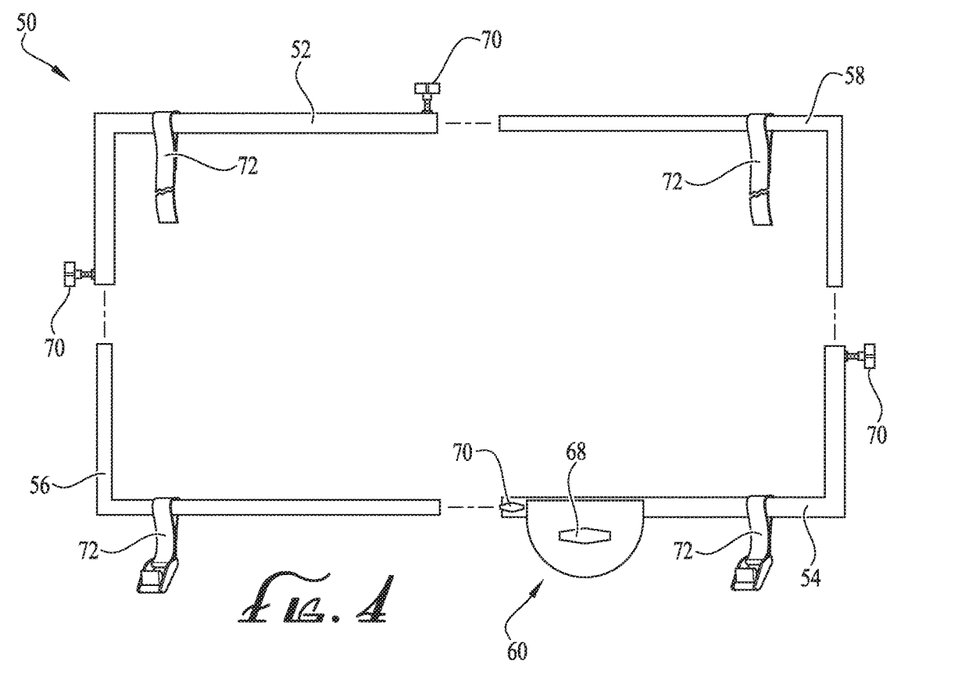
FIG. 4 is a plan perspective view of an engagement assembly of the equipment support assembly of FIG. 1, showing the components thereof substantially disassembled.
Figure 5:
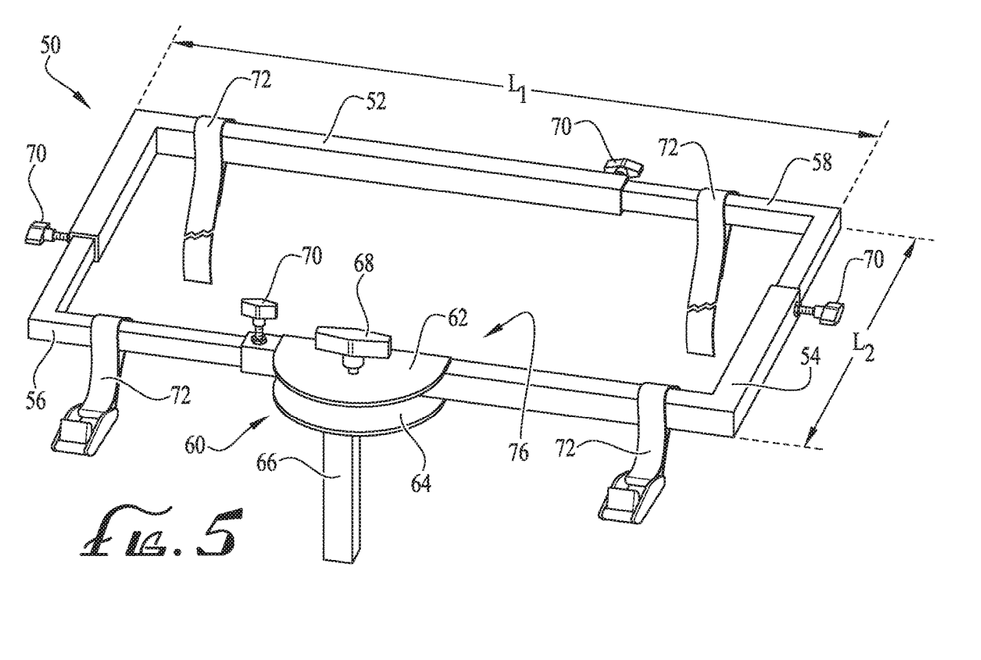
FIG. 5 is a perspective view of the engagement assembly of FIG. 4, showing the components thereof assembled together.

Referring to FIGS. 4-5, the engagement assembly 50 generally comprises four L-shaped members, for example, a first female L-shaped member 52, a second female L-shaped member 54, a first male L-shaped member 56 and a second male L-shaped member 58. According to example embodiments, the ends of the first and second male L-shaped members 56, 58 are configured for being removably received within the ends of the first and second female L-shaped members 52, 54, and for example, fasteners 70 are provided at the ends of the first and second female L-shaped members for securing the ends of the first and second L-shaped members thereto (see FIG. 5). According to one example embodiment, one or more of the first and second L-shaped members can comprise fastening or securement components or straps 72 so as to temporarily secure the engagement assembly 50 with a desired fixed structure or stable component. According to one example embodiment as described above, the fixed structure or stable component is a wheel assembly WA, for example, a wheel assembly of a vehicle V or other mobile device or structure such as a recreational vehicle, a camper, a trailer, $5^{th}$ wheel, etc. As such, when temporarily securing the engagement assembly 50 to a wheel assembly WA, an opening 76 defined within the connected L-shaped brackets 52, 54, 56, 58 is generally sized to at least partially engage with a portion of the wheel assembly WA (e.g., the tire as shown in FIG. 1), the fasteners 70 are secured to as to maintain the desired size of the opening 76, and the straps 72 extend through at least a portion thereof so as to maintain secure and stable engagement of the engagement assembly 50 with the wheel assembly WA. Preferably, according to other example embodiments, one or more forms of securement straps, fasteners, couplings or desired attachment members can be provided for securing and stabilizing the engagement assembly 50 with the wheel assembly WA (or other desired fixed structures or stable components as desired).

Still referring to FIG. 5, according to example embodiments the second female L-shaped member 54 comprises the hub or junction 60, for example, which permits the second end 32 of the second component 30 of the support assembly 20 to be pivotally mounted thereto. According to example embodiments, the junction 60 comprises first and second radiused or curved plates 62, 64, for example, which are generally mounted to opposite surfaces of a long portion of the second female L-shaped member 54, thereby providing at least some spacing therebetween for receiving the second end 32 of the second component 30. As described above, a fastener 68 is provided and is configured to extend through at least one of the plates 62, 64 and within the receiver 37 of the second end 32 such that the second component 30 is pivotally mounted to the junction 60. As depicted in FIG. 3, with the second end 32 pivotally mounted to the junction 60, the second component 30 is capable of pivoting at least about 180 degrees to provide for infinite adjustability thereto. According to example embodiments, the fastener 68 is configured for both recurring the second end to the junction 60 while also acting as the axis about which the second component pivots.

Referring to FIGS. 3 and 5, the engagement assembly 50 is preferably substantially adjustable, for example, such that the opening 76 defined therein can be sized appropriately according the size (e.g., diameter DIA and depth or width) of the wheel assembly WA (e.g., tire T and/or wheel W). According to example embodiments, the opening 76 of the engagement assembly 50 defines a length L1 and a width W1. According to example embodiments, the engagement assembly 50 is adjustable such that the length L1 can be varied between about 8-36 inches and the width L2 can be varied between about 4-24 inches. According to one example embodiment, the opening can be adjusted between a minimum-dimension configuration (e.g., 20 inches×6 inches) and a maximum-dimension configuration (e.g., 45 inches×18 inches). In other example embodiments, the engagement assembly 50 can preferably be configured so as to provide an opening of the desired dimensions. According to another example embodiment, the length L1 and width L2 are measured from the outermost portions of the engagement assembly 50, for example, such that the length L1 is generally between about 8-55 inches and the width L2 is generally between about 4-38 inches. Preferably, the opening 76 is configured so as to be at least partially engageable with a portion of a wheel assembly WA (or wheel W or tire T thereof), or for example, with a desired fixed structure or stable component.

In alternate example embodiments, the engagement assembly 50 can comprise one or more members, which can at least provide for engaging at least a portion of a fixed structure, stable component, or for example, a wheel assembly or wheel or tire thereof. According to some example embodiments, the engagement assembly can comprise a single member, for example, which can be engaged and at least temporarily secured with a desired fixed structure or stable component. In other example embodiments, two or more members or components can be slidably and/or pivotally mounted to each other so as to provide multiple configurations and orientations for accommodating temporarily engaging various fixed structures, stable components or various wheel assemblies (or the wheel(s) and/or tire(s) thereof). According to one example embodiment, the engagement assembly comprises a U-shaped member that is configured for at least partially engaging a desired structure or component for maintaining stability to the stand 10.

Referring to FIGS. 1-2 and 7-8, the stand 10 can optionally comprise a shelf 100 for supporting one or more additional devices or components, for example, such as a cable box, remote or various other electronic devices, components, accessory hardware, etc. In example embodiments, the shelf 100 comprises a platform 102 defining an upper surface 104, and a female coupling 110 is provided generally near the platform 102 for permitting removable engagement with a portion of the elongate member 25. According to example embodiments, the female coupling 110 comprises a body extension component 112 defining an opening 114 extending therethrough, and wherein a fastener 116 rotatably mounted to the body 112 allows for removably securing the female coupling 110 (and platform 102 thereof) along the length of the elongate member 25. Preferably, the shelf 100 can be positioned at a desired height along the length of the elongate member 25.

In example embodiments, the shelf 100 can preferably be removably mounted to at least a portion of the support 20 and can be adjustable relative to the support 20. For example, according to one example embodiment, the shelf 100 is removably mounted to a portion of the elongate member 25, for example, along a portion thereof that is generally between the first and second ends 23, 24. For example, with the second end 24 generally removably mounted with the female coupling 34 of the second component 30, the shelf 100 is generally removably secured to the elongate member 25 at a position above the second end, thereby permitting removable engagement between the second end 24 and female coupling 34. According to other example embodiments, the shelf 100 can preferably be mounted to the stand 10 as desired.

Referring back to FIG. 3 and according to one example embodiment, the stability extension or component 80 connects to a portion of the support assembly, the bracket assembly, or one or more other portions as desired, for example, and extends to engage with a ground surface G. In example embodiments, the stability component 80 provides support to the stand 10, for example, such that the stand 10 remains in the upright and expanded configuration while being at least partially supported and/or stabilized by the bracket assembly. In example embodiments, the stability component 80 is configured for removable engagement with a female coupling 66 extending from the junction 60. According to example embodiments, the stability component 80 comprises a first component 82 and a second component 84, for example, wherein the first component 82 is in the form of a male member and the second component 84 is in the form of a female member. In example embodiments, the second component 84 comprises a base support or platform 86, for example, which is generally at least partially larger than the cross-sectional area of the second component 84, so as to provide an engagement or contact surface with the ground surface G when the stand 10 is assembled and supporting a device D. According to example embodiments, a first end of the first component 82 is received within a portion of the coupling 66 of the junction 60, and for example, a fastener 88 is provided for removably securing the two together. And the second end of the first component 82 is received within at least a portion of the second component 84, for example, wherein another fastener 88 provides for removably securing the same together. In example embodiments, the stability component 80 is preferably adjustable length-wise to accommodate varying lengths thereof such that the platform 86 is at least in contact with the ground surface G.

Figure 9:
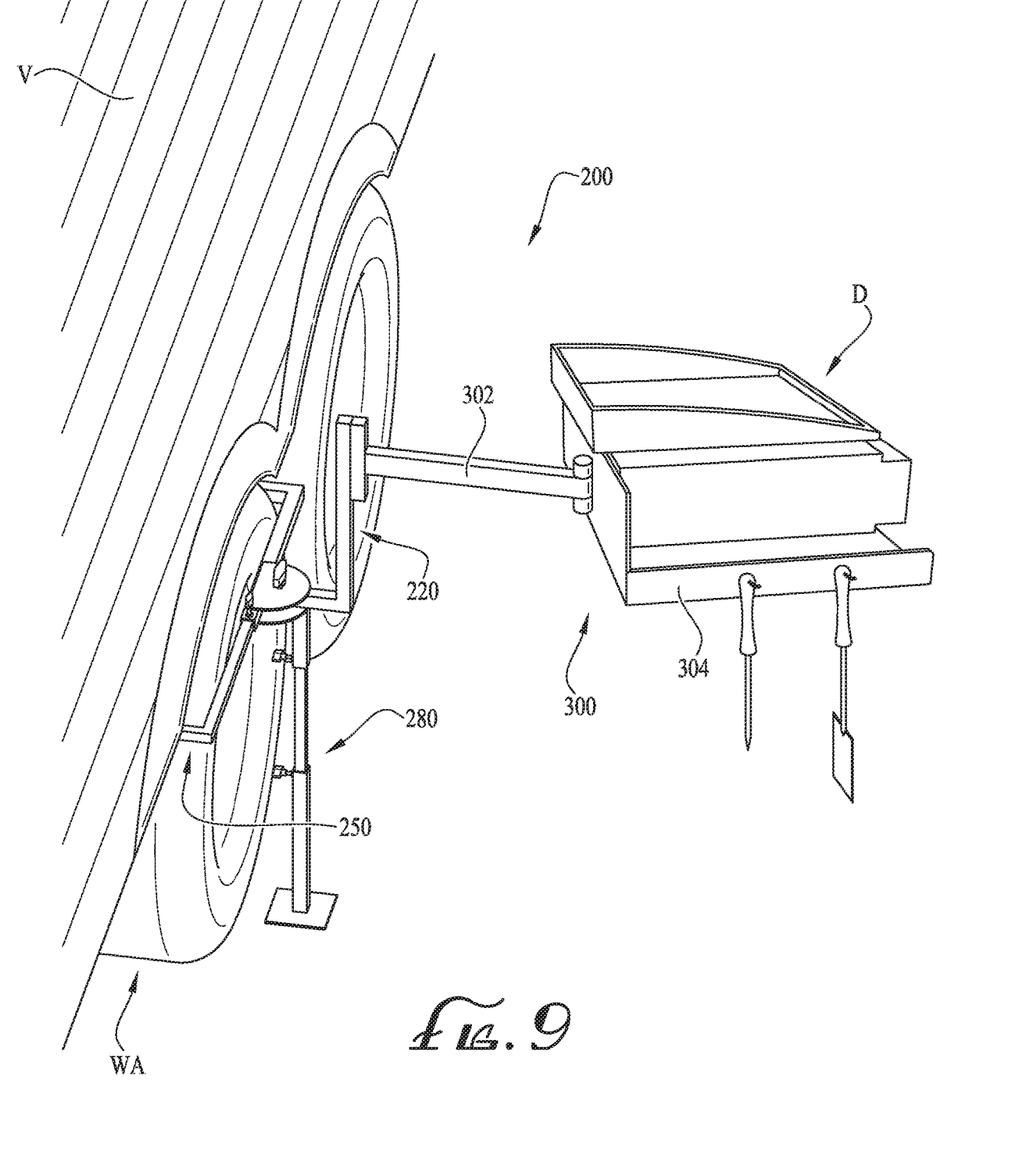
FIG. 9 is a perspective view of a equipment support assembly according to another example embodiment of the present invention

FIG. 9 shows a stand 200 for supporting a device D according to another example embodiment of the present invention. As depicted, the stand 200 comprises a support assembly 220, an engagement assembly 250, and a stability extension 280 (as similarly described above). According to example embodiments, an mounting assembly 300 is configured for removable engagement with the support assembly 220, for example, wherein a first end of an extension arm 302 is mounted (permanently, removably and/or pivotally) to a portion of the support assembly 220 and a second end thereof being pivotally mounted to a portion of a tray or device receiver or platform 304. For example, according to example embodiments, the mounting assembly 300 is generally configured for supporting a device D in the form of cooking or grilling equipment, for example, a barbeque grill. According to example embodiments, the extension arm 302 is preferably extendable and retractable so as to provide a desired distance between the support assembly 220 and the platform 304.

According to additional example embodiments of the present invention, one or more additional components can be secured to a portion of the stand 10, 200 so as to support one or more audio-emitting devices (e.g., speakers) and/or other desired components such as a satellite television receiver (e.g., dish, Direct TV, etc.), a satellite dish, a fan, flag(s), flag pole(s), banner(s), umbrella(s) or any additional devices, components or other items as desired. For example, according to one example embodiment, an insect attractant device can be suspended or supported by the stand 10, 200, for example, such that a user or person can remain comfortable and free from bug bites while being entertained outside.

According to some example embodiments, one or more cables and/or electrical, audio and/or video connections can be integrated into one or more portions of the stand 10, 200 such that minimal wiring is required to connect the device D, cable box CB and/or other components to each other and with a power supply. In some example embodiments, a solar panel or other alternative energy generation device can be integrated into the stand 10, 200 so as to provide power to one or more electronic devices. In some example embodiments, the stand 10, 200 comprises one or more rechargeable batteries or other on-board energy supply. According to some example embodiments, the stand 10, 200 can comprise one or more lights, buttons and/or other components for providing visual enhancements and/or allowing for control to one or more components or portions thereof.

According to example embodiments as described above, the wheel assembly WA (or wheel and/or tire thereof) can be used for providing removably engagement with the engagement assembly 50, 250. Preferably, the wheel assembly can be of any desired form and can be a component of any desired vehicle or other wheeled component. In some example embodiments, the wheel W and tire T are a component of a camper trailer. In some example embodiments, the wheel W and tire T are a component of a trailer. In some example embodiments, the wheel W and tire T are a component of a vehicle. And in some example embodiments, the wheel W and tire T are a component of any other desired wheeled component, vehicle or other apparatus or mechanism.

According to example embodiments, the stand 10, 200 as described herein can be reconfigurable between a compacted, collapsed configuration and an erect, expanded configuration. According to example embodiments, the stand 10, 200 provides for substantial adjustability to its size so as to be portable and travel-friendly. In example embodiments, the compacted, collapsed configuration is such that the stand 10, 200 can be easily stored or packed/compacted without taking up much room or space. In example embodiments, the stand 10, 200 can preferably be assembled to an expanded configuration in little time, thereby causing less pain, frustration and set-up time for the person or user.

According to example embodiments, the stand 10, 200 can be formed from any desired material(s). According to one example embodiment, the stand 10, 200 is formed from one or more steel or metal components. In other example embodiments, the stand 10, 200 can be formed from one or more polyvinyl chloride (PVC) components. In yet other example embodiments, the stand 10, 200 can be formed from other materials including other metals, plastics, composites, polymers, natural materials (e.g., wood), synthetic materials, other desired materials and/or combinations thereof. In example embodiments and as described above, one or more additional components such as fasteners, straps, couplings, engagement members, snaps, bolts, screws, etc. can be provided as desired.

According to some example embodiments, one or more legs can be incorporated with the stand 10, 200, for example, such that the stand 10, 200 can be supported without engagement or securement to a wheel and/or tire. According to some example embodiments, the one or more legs can be in the form of an attachment or tri-pod type mechanism that is removably mounted to a portion of the stand 10, 200. According to some example embodiments, other legs or support members can be provided as desired so as to support the stand 10, 200 without requiring engagement with a wheel assembly, a fixed structure and/or stable component. In other example embodiments, the stand 10, 200 can be engaged with one or more wheels W and/or tires T while also comprising some additional support and/or stability members for engagement with one or more additional structures, the ground, etc.

According to some example embodiments, two or more devices D can be attached and supported by a single stand 10, 200. In some example embodiments, the stand 10, 200 can comprise an additional bracket so as to provide support for supporting two televisions or dissimilar devices D.

According to example embodiments, one or more additional supports, brackets, mounts, clips, clasps, engagement components, etc. can be used as desired, for example, to at least partially suspend or support an electronic device or other desired component(s) or device(s) above a ground surface in a desired location.

In example embodiments, the stand 10, 200 can be used indoors and outdoors as desired. In some example embodiments, one or more additional stability components can be secured between the stand 10, 200 and the ground G or desired support surface (e.g., floor, platform, stage, or other surface).

According to some example embodiments, the stand 10, 200 can be integrally formed together as one piece, for example, which still may permit one or more connected portions thereof to allow for movement so as to provide for collapsing/expansion/adjustability of the same. According to other example embodiments, the stand 10, 200 can be formed from two or more components that are formed or manufactured separately and assembled, and for example, adjustable and reconfigurable between a collapsed configuration and an expanded configuration.

While the invention has been described with reference to example embodiments, it will be understood by those skilled in the art that a variety of modifications, additions and deletions are within the scope of the invention, as defined by the following claims.

What is claimed is:

1. An equipment support assembly comprising:
   an engagement assembly comprising at least one component configured for removable engagement with at least a portion of a wheel assembly;
   a support assembly removably engaged with the engagement assembly and configured for removably receiving at least one device or equipment component; and
   a stability assembly removably engaged with the engagement assembly and configured for providing stability to the support assembly while the engagement assembly is removably engaged with at least a portion of a wheel assembly, wherein the support assembly extends from the engagement assembly in a first direction, and wherein the stability assembly extends from the engagement assembly in a second direction, the second direction being generally opposite the first direction.

2. The equipment support assembly of claim 1, wherein the engagement assembly comprises at least one component removably engageable with at least a portion of a wheel or tire assembled therewith.

3. The equipment support assembly of claim 1, wherein the engagement assembly comprises two or more components that are assembled together and dimensionally adjustable to provide compatible removable engagement with a wheel or tire assembled therewith.

4. The equipment support assembly of claim 1, wherein the engagement assembly comprises four L-shaped members, the L-shaped members removably engageable so as to define a dimensionally adjustable, closed-loop bracket, an opening being defined within the closed-loop bracket and configured to receive at least a portion of a wheel assembly.

5. The equipment support assembly of claim 1, wherein the support assembly comprises at least one support component, a first portion of the at least one support component being removably engageable with a portion of the engagement assembly, and a second portion of the at least one support portion configured for receiving at least one device or equipment component.

6. The equipment support assembly of claim 1, wherein the stability assembly comprises at least one stability component comprising a first end removably connected with a portion of the engagement assembly and a second end engaging a support surface.

7. The equipment support assembly of claim 1, wherein the at least one device or equipment component comprises at least one component selected from the group consisting of a television or various electronic devices and equipment, cooking or grilling equipment and an umbrella or shade-providing devices.

8. A collapsible and portable stand for supporting a device comprising:
an upright support configured to removably receive the device;
a bracket assembly removably engaged with the upright support, the bracket assembly configured for removable engagement with a fixed structure or stable component; and
a stability extension comprising a first end removably engaged with a portion of the upright support or bracket assembly and a second end extending therefrom and configured for contacting a support or ground surface.

9. The collapsible and portable stand of claim 8, wherein the device comprises a television.

10. The collapsible and portable stand of claim 8, wherein the device comprises a cooking device or equipment.

11. The collapsible and portable stand of claim 8, wherein the bracket assembly comprises at least two bracket components that are removably engageable therewith and dimensionally adjustable between a minimum dimension and a maximum dimension.

12. The collapsible and portable stand of claim 8, wherein the bracket assembly comprises a junction component that is configured for permitting removable engagement of the upright support thereto, the junction configured to permit adjustment of the position of the upright support relative to the bracket assembly.

13. The collapsible and portable stand of claim 8, wherein the fixed structure or stable component comprises a wheel assembly of a vehicle, the wheel assembly at least comprising a tire.

14. A stand for supporting a television, comprising:
an upright support assembly;
a dimensionally adjustable bracket; and
a stability extension component coupled with the adjustable bracket for supporting and providing stability to the upright support member.

15. The stand of claim 14, further comprising a mounting bracket coupled with a portion of the upright support assembly.

16. The stand of claim 15, wherein the television comprises a mounting portion configured for removable and secure engagement with the mounting bracket.

17. The stand of claim 14, wherein the adjustable bracket comprises at least one member configured for removable engagement with a fixed structure or stable component.

18. The stand of claim 17, wherein the fixed structure or stable component comprises a wheel assembly connected to an axle, the wheel assembly at least comprising a tire.

19. The stand of claim 14, further comprising a platform adjustably mounted to at least a portion of the upright support assembly.

20. The stand of claim 19, wherein the platform comprises a surface configured to support an electronic device or media component.

* * * * *